Jan. 15, 1935.  A. U. KERNS ET AL  1,987,957
MACHINE FOR CUTTING RIVETS
Filed Jan. 12, 1933  2 Sheets-Sheet 1
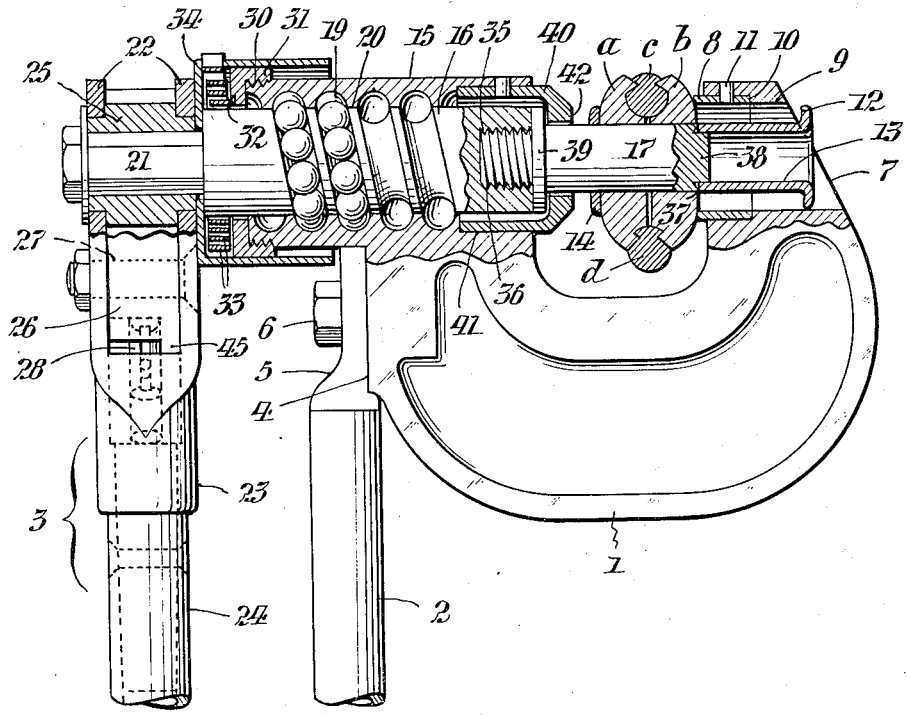
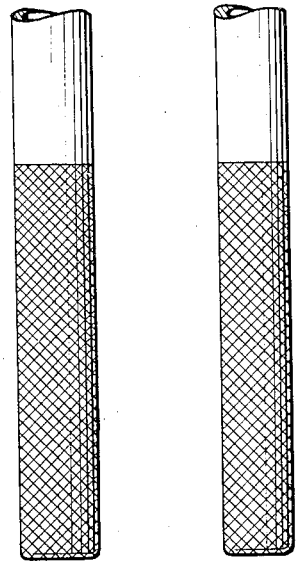
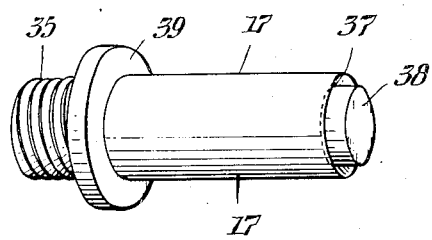
WITNESSES:
INVENTOR:
Adin U. Kerns &
Maxwell B. Harvey,
BY
ATTORNEYS.

Jan. 15, 1935.  A. U. KERNS ET AL  1,987,957
MACHINE FOR CUTTING RIVETS
Filed Jan. 12, 1933    2 Sheets-Sheet 2
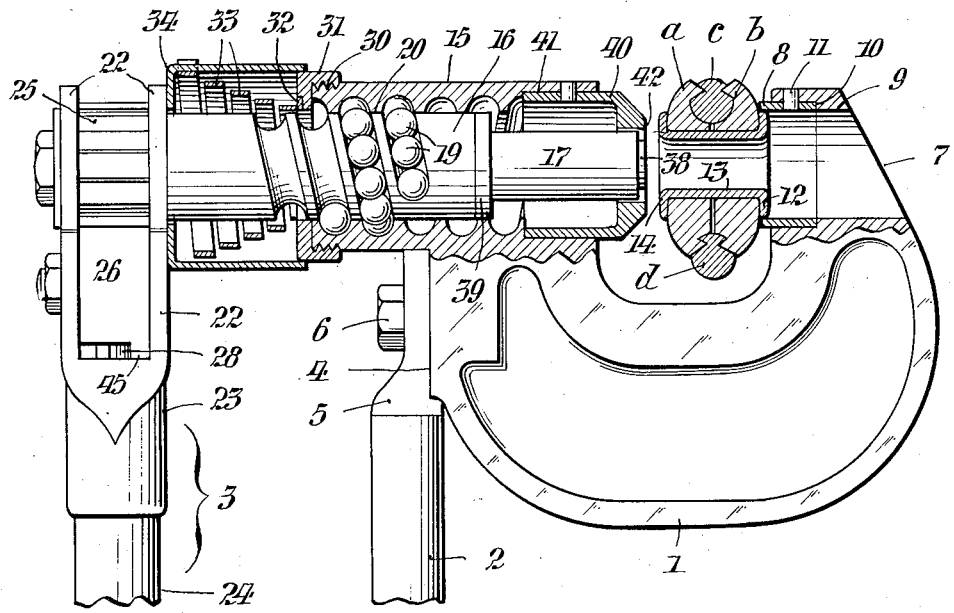
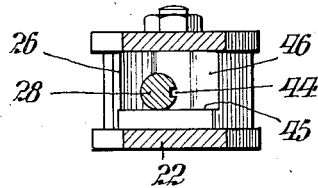
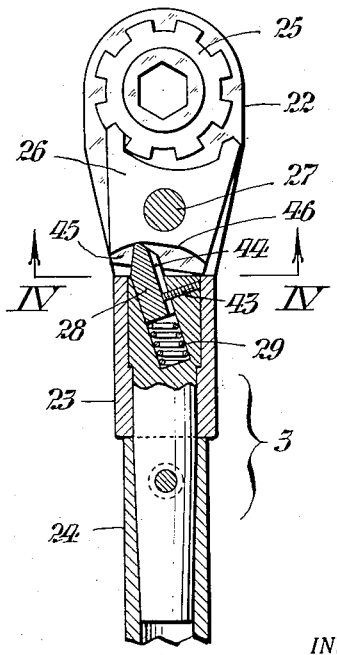
WITNESSES:
Hubert Fuchs
William Bell, Jr.
INVENTOR:
Adin U. Kerns &
Maxwell B Harvey,
BY Fraley Paul
ATTORNEYS.

Patented Jan. 15, 1935

1,987,957

UNITED STATES PATENT OFFICE 1,987,957

MACHINE FOR CUTTING RIVETS

Adin U. Kerns, Altoona, Pa., and Maxwell B. Harvey, East Orange, N. J.

Application January 12, 1933, Serial No. 651,342

1 Claim. (Cl. 164—101)

Our invention relates to machines for cutting rivets, and more particularly to portable machines adapted to be manually operated to effect the removal of rivets from parts joined together by the rivets, without injury to such parts. The machine of our invention is particularly useful in its application to hollow rivets of ductile material such as are used for joining together trolley wire clamps on overhead catenary construction of electrified railways.

The principal object of our invention is to provide a comparatively light and compact rivet cutting machine capable of being operated handily by a single person. A more specific object of the invention is to provide in such a machine a rivet cutter and associate elements so arranged that incident to movement of the cutter the head of the rivet is severed, the body of the rivet is removed from both of the riveted parts, and the severed head is stripped from the cutter.

Still other objects and advantages characteristic of our invention will become more fully apparent from the detailed description of one embodiment or example thereof which follows hereinafter, having reference to the accompanying drawings.

Of the drawings:

Fig. I represents a side elevation, partly in cross section, of a rivet cutting machine of our invention, showing the parts in the position which they occupy after the rivet has been cut.

Fig. II represents a similar view of a portion of the same machine, showing the parts in the position which they occupy just prior to the cutting operation.

Fig. III represents a detailed view, partly in cross section, of the ratchet wrench which comprises a part of the rivet cutting machine.

Fig. IV represents a cross section of the same, taken as indicated by the lines IV—IV of Fig. III; and Fig. V represents a perspective view of the rivet cutting tool of the machine.

With particular reference to Figs. I and II of the drawings, there is represented a rivet cutting machine which is adapted to sever a rivet of ductile material joining together trolley wire clamps designated at $a$ and $b$. Such clamps $a$ and $b$ are used for connecting together and maintaining in spaced relation a messenger wire $c$ and a contact wire $d$ of the catenary construction of electrified railways. The machine is of a portable type which can be readily operated by a single person, either seated in a boatswain's chair suspended from the wire upon which he is working, or standing on an elevated platform of a tower car or the like adjacent to the wire. While the machine is here shown as specifically adapted to the severing of rivets joining together trolley wire clamps, it will be readily apparent that the machine has many other uses, and that the illustrated embodiment represents but one example of a use to which the machine may be put.

The machine shown in the drawings is substantially similar, as to its general construction, to the riveting machine shown in the pending application for U. S. Letters Patent filed by Adin U. Kerns, September 28, 1932, Serial No. 635,170. In fact, the machine is so constructed that it can be readily converted by a substitution of small parts from a machine having a riveting function, as described in the pending application referred to, to a machine having a rivet cutting function as herein described.

Generally, the machine comprises a yoke frame 1 having thereon a rigid handle 2, and a ratchet wrench comprehensively designated at 3 for controlling the rivet cutting operation. The rigid handle 2 may take a variety of forms. In the present instance it is shown to be of tubular shape and is attached to a flat surface 4 of the yoke frame, by means of a connecting boss 5 and a stud bolt 6.

At one end 7 of the yoke frame 1 there is provided a non-rotating or fixed die 8. The end 7 of the yoke frame 1 has a cylindrical bore 9 in which there is a shoulder 10 upon which the non-rotating or fixed die 8 is seated. The die 8 is shown secured in place by a pin 11 and is readily removable. The die 8 serves to engage the clamp part $b$, and being of hollow cylindrical shape, it is adapted to receive the head 12 of the rivet 13 which joins together the companion parts $a$ and $b$.

At the opposite end 15 of the yoke frame 1, there is a driving spindle 16 in the form of a screw. The screw 16 has removably fitted thereto a rivet cutting tool 17, shown in perspective in Fig. V, the rivet cutting tool being disposed in opposite relation to the die 8. The rivet cutting tool 17 is adapted to pass through the head 14 of the rivet 13 and to sever the same by a combined rotary and translatory movement. To impart this movement to the rivet cutting tool 17, the spindle 16 turns in spiral ball bearings 19 within the cylindrical bar 20 at the end 15 of the yoke frame 1. The screw 16 has a nut-shaped portion 21 projecting outward beyond the yoke frame 1. To the nut-shaped portion 21 of the screw 16, the socketed ratchet wrench 3 is applied.

While other forms of double acting ratchet wrenches may be used to effect turning movement of the screw 16, we preferably employ a wrench of the type shown in the pending application for U. S. Letters Patent filed by Adin U. Kerns, September 28, 1932, Serial No. 635,171. This type of ratchet wrench, as shown in Fig. III, comprises generally a bifurcated head 22 having a sleeve portion 23 to which a handle 24 is fitted, with capacity for relative rotation of movement about the longitudinal axis of the wrench. Housed within the bifurcated head 22, there is a ratchet wheel 25 socketed to the nut-shaped portion 21 of the screw 16. A pawl 26 pivoted on a pin 27 engages the ratchet wheel 25. In the end of the rigid handle 24 there is a pawl actuating pin 28 urged against the pawl 26 by a spring 29. By a turning movement of the handle 24, the pawl actuating pin 28 is caused to swing the pawl 26 from side to side. A key 43 engaging in a keyway 44 of the pin 28 guides the movement of the pin. A shelf 45 located at the base of the pawl 26, as shown in Fig. IV, limits the turning movement of the handle 24 to a half turn. With the handle 24 in one extreme position, the ratchet wrench 3 operates to advance the rivet cutting tool 17 towards the die 8. With the handle 24 in the opposite position, the rivet cutting tool 17 will be separated from the fixed die 8 by operation of the ratchet wrench; and with the handle 24 in an intermediate position, in which the pin 28 is disposed centrally of the cam surfaces 46 of the pawl 26, the pawl 26 of the ratchet wrench will be out of engagement with the ratchet wheel 25. Thus the ratchet wrench 3 is a double acting wrench adjustable by turning movement of the handle 24 to assume either "ahead", "reverse" or "neutral" position.

The end 15 of the yoke frame 1 is externally threaded at 30, and on this end there is fitted a correspondingly threaded cap 31. The cap 31 has a face 32 which engages one end of a flat spiral spring 33. The opposite end of the spring 33 bears upon a cup-shaped housing 34, which encloses the spring 33, and which is interposed between the ratchet wrench 3 and the cap 31. The spring 33 serves as a means for urging the driving screw 16 in a direction such as to separate the rivet cutting tool 17 from the fixed die 8, and is operative to impart such movement to the driving screw 16 when the ratchet wrench 3 is in neutral position.

The rivet cutting tool 17 is preferably made in the form shown in Fig. V. It has a threaded end 35 engaging in a correspondingly threaded opening 36 in the driving screw 16. At the opposite end it is provided with an annular cutting edge 37 and a cylindrical head 38 of less diameter than the cutting edge. A projecting flange 39 adjacent to the threaded end 35 engages the end of the screw 16 when the cutting tool 17 is screwed home. Surrounding the cutting tool 17 there is a stripping device 40 of hollow cylindrical form, this device fitting within an enlarged bore 41 within the end 15 of the yoke frame 1. The stripping device 40 includes a flat face 42 having an opening therethrough to permit the passage of the cutting tool 17.

The operation of the above described machine is as follows: Assuming that the ratchet wrench 3 is in neutral position, and that the operator is about to cut the head of a rivet, and that the cutting tool 17 is spaced apart from the die 8, as shown in Fig. II, the operator proceeds to steady the machine by the rigid handle 2 so that it straddles the trolley wire clamps $a$ and $b$ with the die 8 engaging the clamp member $b$ and receiving within its hollow interior the head 12 of the rivet. The operator then turns the handle 24 of the ratchet wrench 3 to adjust the wrench to ahead position. With a back and forth movement of the handle 24, the driving screw 16 is caused to advance within the end 15 of the yoke frame 1, carrying the rivet cutting tool 17 toward the head 14 of the rivet 12. When the rivet cutting tool 17 penetrates the head 14, it engages the body portion of the rivet. With further movement of the driving screw 16, the body portion of the rivet is forced endwise through the clamp members $a$ and $b$, and into the cylindrical bore 9 at the end 7 of the yoke frame 1 to the position shown in Fig. I. Incident to this operation, the cylindrical head 38 of the rivet cutting tool is guided within the body of the hollow rivet. The operator proceeds to advance the rivet cutting tool 17 until the same has reached the position shown in Fig. I, at which position the clamp members $a$, $b$ have been freed from the rivet.

When the rivet has been severed in the above manner, the operator turns the handle 24 of the ratchet wrench 3 about its longitudinal axis to adjust the ratchet wrench to reverse position. He then moves the handle 24 back and forth, causing the driving screw 16 to recede within the end 15 of the yoke frame 1 carrying with it the rivet cutting tool 17. A few turns of the handle 24 are sufficient to free the rivet cutting tool 17 of the clamp members. As soon as the rivet cutting tool is out of engagement with the clamp parts, the operator then adjusts the ratchet wrench 3 to neutral position by rotation of the handle 24. With the ratchet wrench 3 in neutral position, the driving screw 16 is free to move under the influence of the release spring 33, so that the rivet cutting tool 17 is automatically brought to a fully separated position from the die 8. Incident to the return movement of the rivet cutting tool 17, the severed head 14 of the rivet is engaged by the face 42 of the stripping device 40 and is removed as the rivet cutting tool 17 returns within the stripping device, falling off at one side or the other of the yoke frame 1. When the parts of the machine have thus been returned to their original position, the clamp members $a$ and $b$ are no longer held together, and they fall off from the wires $c$ and $d$ to the ground.

It will be especially noted that the rivet 13 is forced all the way through the clamp members $a$ and $b$, into the cylindrical bore 9 of the yoke frame 1. This bore 9 of the yoke frame being of considerably larger diameter than that of the rivet head 12, the rivet 13 will readily pass through it and fall to the ground.

While we have described one particular example or embodiment of our invention, showing the application of the invention to the severing of rivets on overhead trolley wires, it will be apparent that the invention is adapted for many other uses and that various changes are contemplated in the form of the apparatus herein illustrated and described, without departing from the spirit of our invention as defined in the claim hereto annexed.

Having thus described our invention, we claim:

In a machine for cutting rivets, a yoke frame having a clamping die at one end thereof, a screw movable freely through the other end of said frame and having thereon a rotary cutting tool normally separated from said clamping die to permit the insertion of a rivet therebetween, a handle rigid with said frame and extending therefrom in a plane substantially perpendicular to the axis of said screw, a ratchet wrench having a handle disposed in a plane parallel and adjacent to said rigid handle and releasably engaging said screw, said ratchet handle being operable to advance said cutting tool while rotating the same toward the rivet, and a release spring disposed between said two handles and serving to return the cutting tool to its normal position when the ratchet handle is released.

ADIN U. KERNS.
MAXWELL B. HARVEY.